United States Patent [19]
Fukao

[11] Patent Number: 5,836,148
[45] Date of Patent: Nov. 17, 1998

[54] CABLE CHAIN

[75] Inventor: Hitoshi Fukao, Komaki, Japan

[73] Assignee: Kunimorikagaku Ltd., Aichi-ken, Japan

[21] Appl. No.: 692,383

[22] Filed: Aug. 5, 1996

[30]     Foreign Application Priority Data

Feb. 6, 1996  [JP]  Japan ................................ 8-045423
  Apr. 5, 1996  [JP]  Japan ................................ 8-110456

[51] Int. Cl.[6] ................................................ F16G 13/02
[52] U.S. Cl. ............................ 59/78.1; 59/900; 248/49
[58] Field of Search .......................... 59/78, 78.1, 900; 248/49

[56]                  References Cited

U.S. PATENT DOCUMENTS

| | | | |
|---|---|---|---|
| 3,197,954 | 8/1965 | Merker et al. .......................... | 59/78.1 |
| 3,473,769 | 10/1969 | James .................................... | 59/78.1 |
| 3,779,003 | 12/1973 | Boissevain et al. ................. | 59/78.1 |
| 4,570,437 | 2/1986 | Moritz .................................. | 59/78.1 |
| 5,134,251 | 7/1992 | Martin ................................. | 59/78.1 |
| 5,240,209 | 8/1993 | Kutsch ................................ | 59/78.1 |

FOREIGN PATENT DOCUMENTS

| | | | |
|---|---|---|---|
| 259725 | 3/1988 | European Pat. Off. ............. | 59/78.1 |
| 265449 | 3/1989 | Germany ............................ | 59/78.1 |
| 2-186146 | 7/1990 | Japan . | |

*Primary Examiner*—David Jones
*Attorney, Agent, or Firm*—Frishauf, Holtz, Goodman, Langer & Chick

[57]                  ABSTRACT

A cable chain having a number of chain unit members made of synthetic resin, wherein each of the chain unit members includes a supporting plate for mutually connecting together a pair of side plates opposite each other at an appointed interval and side plates opposite each other at both ends of the supporting plate at a lower portion thereof. A covering member made of synthetic resin covers an upper opening of the respective chain unit members, and a hinge member is provided which is made of synthetic resin having an integral hinge property. The hinge member is molded in advance to be a plate-like member having an engaging portion to be engaged in an attaching hole secured at the respective supporting plates of adjacent chain unit members, or is welded to and linked with the respective supporting plates of adjacent chain unit members by injection.

12 Claims, 13 Drawing Sheets

CABLE CHAIN

BACKGROUND OF THE INVENTION

The present invention relates to a cable chain which is able to bendably guide a cable or hose (hereinafter called cable) of electricity, signals, or fluids such as air, oil, etc.

There is a danger that a cable which supplies electric power, control signals, fluid or the like to a drive member attached to a reciprocating movable body will become trailed, bent and finally damaged in line with movements of said movable body.

In order to solve this drawback, as shown in, for example, Japanese laid open patent publication No. Hei-2-186146, various kinds of cable chains have been developed, wherein a plurality of guide members, in which a pair of link plates having an axial part at one end thereof and an axial supporting part at the other end thereof and guide plates provided on and below said link plate are formed to be frame-like, are bendably connected to each other by causing said axial part thereof to be engaged with said axial supporting part thereof, wherein said guide plates respectively have a flexible tongue piece protruded at least at one end in the forward and backward direction, and said tongue piece is provided so as to close between said guide plate.

In this kind of cable chain, guide members of a quantity responsive to the moving distance of a movable body are connected to each other so as to secure a necessary length by causing the axial part at one link other link plate, and the upper opening thereof is closed by a covering member after a cable is accommodated in the respective guide members.

Therefore, in a conventional cable chain, there are some shortcomings. That is, since the connection mechanism of the respective guide members is complicated, the production cost thereof is high, and simultaneously the connection of the respective guide members is cumbersome.

Furthermore, such a kind of cable chain generates wearing powder due to wearing by friction between chain unit members in line with the bending thereof. Therefore, this kind of cable is not able to be used in foodstuff processing equipment, production equipment for producing electronic components, and equipment for in a clean room, etc. Still furthermore, in the abovementioned cable chain, since it is necessary to form guide members and covering members separately, the production efficiency is not good.

SUMMARY OF THE INVENTION

The invention was developed in order to solve these and other shortcomings inherent to the conventional cable chains. It is therefore an object of the invention to provide a cable chain in which the structure of chain unit members is simplified to lower the production cost thereof and the connection work of the respective chain unit members is able to be easily performed.

It is another object of the invention to provide a cable chain which does not generate any wearing powder due to the friction wearing of chain unit members.

It is still another object of the invention to provide a cable chain which is able to securely accommodate a cable despite that the cable chain has such a structure in which the covering members are openably formed integrally with guide members.

Further details and advantages of this invention will be seen in the accompanying drawings and following description of preferred embodiments.

DESCRIPTION OF PREFERRED EMBODIMENTS

Figure 1:
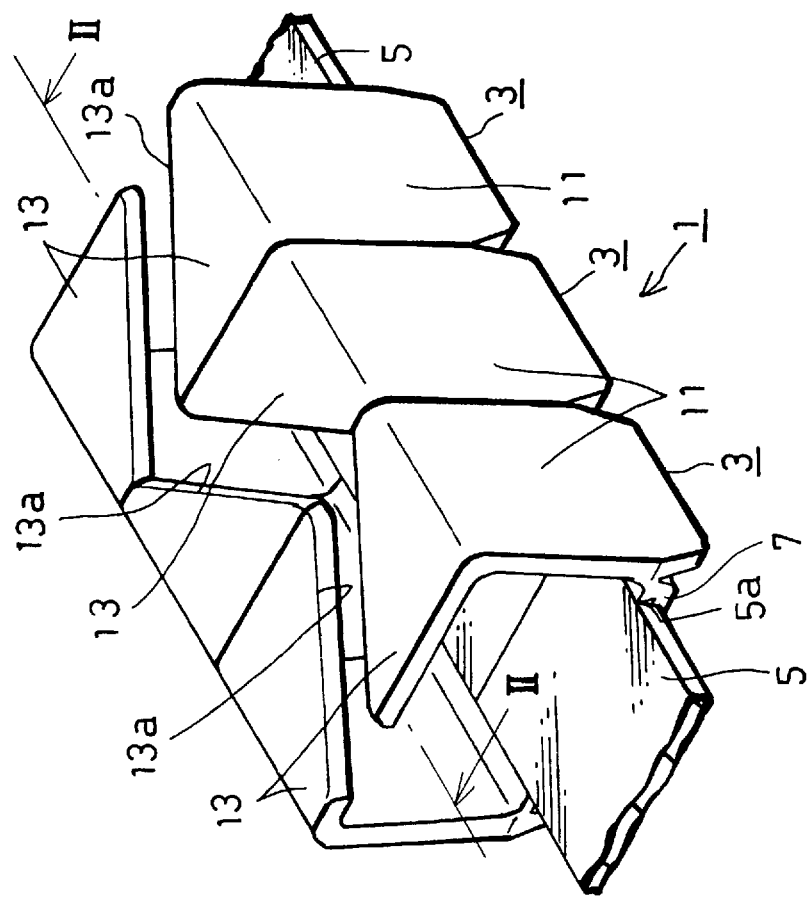
FIG. 1 is a perspective view showing the outline of a cable chain according to a first preferred embodiment.
Figure 2:
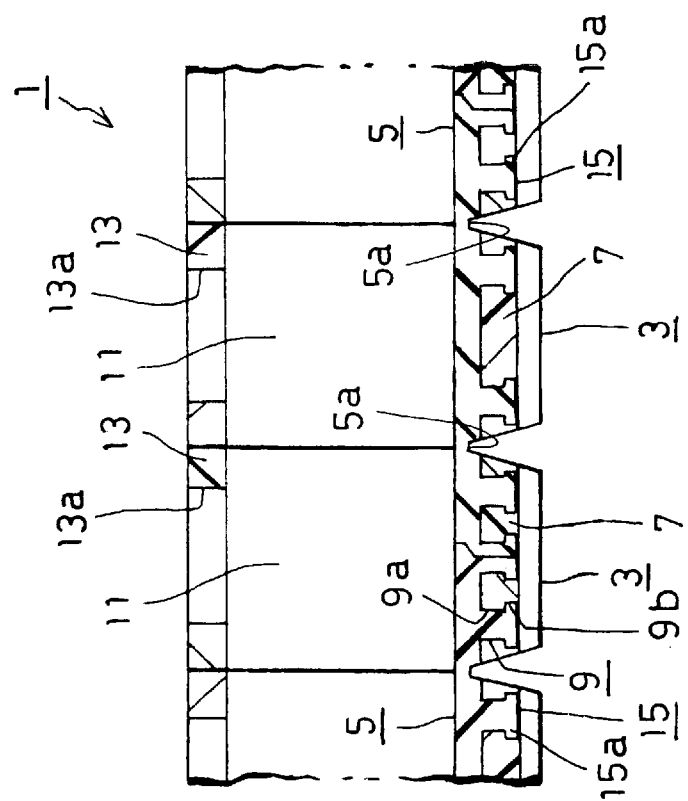
FIG. 2 is a longitudinally sectional view taken along the line II—II in FIG. 1.
Figure 3:
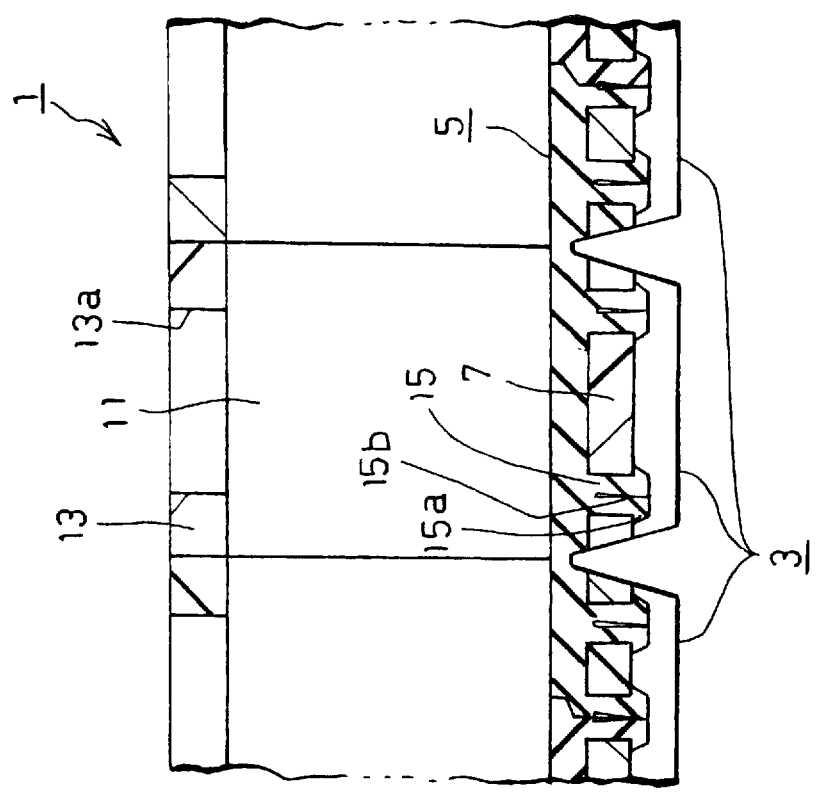
FIG. 3 is a longitudinally sectional view showing a fixing example of a hinge member.

A description is given below of preferred embodiments of the invention. preferred embodiment is shown in FIGS. 1–3, wherein a cable chain 1 is formed of a number of chain unit members 3 connected to each other by hinges 5.

Each of the chain unit members 3 is formed of synthetic resin such as polypropyrene resin, polyamide resin, vinyl chloride resin, etc., to make the inside hollow, and is molded to be almost rectangular at the front elevational section thereof. Furthermore, it is needless to say that the front elevational shape of a chain unit member 3 is not limited to the above shape.

A plurality of engaging openings 9 (3 openings in the illustrated example) are formed at an equal interval in the direction orthogonal to the connection thereof at the forward, backward and central portions of the supporting plate 7 at the respective chain unit members 3, and the respective engaging openings 9 are molded to be staged so as to have a diameter-reduced portion at the upper part thereof and a diameter-swelled portion at the lower part thereof.

A pair of side wall portions 11 are molded to be erect at an appointed height and to be opposite each other at both ends in the direction orthogonal to the connection of the respective supporting plates 7. Furthermore, a covering member 13 is molded at the upper part of each side wall portion 11 in parallel to the supporting plate 7, and an opening 13a which extends to be inclined at an appointed degree of angle relative to the connection direction (or the direction orthogonal to the connection) is formed at said covering member 13.

The respective chain unit members 3 are connected to each other by hinge members 5 to be arrayed with the inclination directions of the respective openings 13a alternately differed. Said hinge member, 5 which is made of synthetic resin having an excellent integral hinge property such as polypropyrene resin, polyamide resin, etc., is positioned on the upper surface of the supporting plate 7 and has a length in the connection direction covering a plurality of chain unit members 3. An axial portion 15 having a diameter-swelled head portion 15a is formed integrally on the bottom of the hinge member 5 insertably into the engaging opening 9, whereby when the axial portion 15 of the hinge member 5 is pressure-fit in the respective engaging openings 9, the diameter-swelled head portion 15a is engaged in the diameter-swelled portion 9b so as to connect the respective chain unit members 3 to each other.

An inversed V-shaped groove 5a is formed at the hinge member 5 located between the respective chain unit members 3 so as to extend in the direction orthogonal to the connection thereof, and the hinge member 5 is bent by said groove 5. Said groove 5 has a depth which is almost half the thickness of the hinge member 5.

As shown in FIG. 3, a band-like hinge member 5 which is made of synthetic resin having an integral hinge property mentioned above, is molded to be like a plate having an axial portion 15 at the bottom thereof, and connects the respective chain unit members 3 by pressure fitting the axial portion 15 of the hinge portion 5 into the respective engaging opening 9 of the respective chain unit members 3, has a tip-split groove 15b formed at the diameter-swelled head portion 15a, thereby permitting the diameter-swelled portion to be made small in its diameter, whereby the pressure-fitting thereof is made easier. A plurality of chain unit members 3 which are arrayed so as to make the respective openings 13a alternate is regarded as one unit (in the illustrated example, two chain unit members 3 are made one unit), and a hinge member 5 may be secondarily formed by injecting the abovementioned synthetic resin onto the upper surface of a supporting plate 7 through an opening engaging opening 9 at the chain unit member 3. In this case, since a part of the hinge member 5 is welded to the upper surface of the supporting plate 7 while being filled up in the engaging portion 9, it is possible to tightly link the chain unit members with each other. Furthermore, in the case of secondarily molding a hinge member 5 at a chain unit member 5 with the abovementioned synthetic resin, the engaging opening 9 may be a non-through hole. Although there are cases where the mutual weldability between said chain unit member 3 and the hinge member 5 is not good, depending upon the kind of resin, it is possible to tightly link the chain unit members 3 with each other by filling up a part of the hinge member 5 in the engaging opening 9.

Furthermore, chain unit members positioned at the attaching side of a movable body and at the attaching side of the supply source (neither illustrated) may be fixed to the movable body and supply source by a fixing screw (not illustrated) inserted through the opened engaging portion 11 after opening the engaging opening 9 by cutting the hinge member 5 positioned at the end side.

Figure 4:
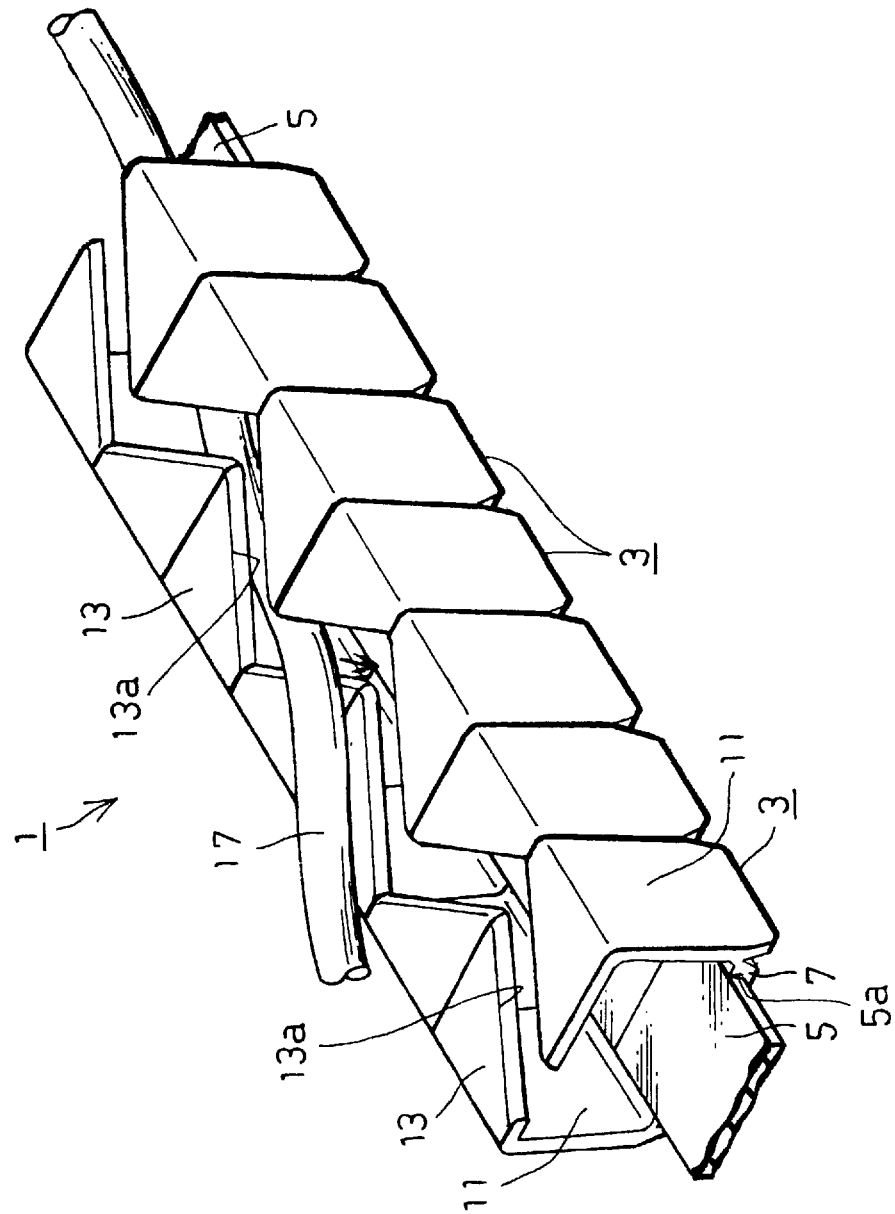
FIG. 4 is a perspective view showing an attached state of a cable.
Figure 5:
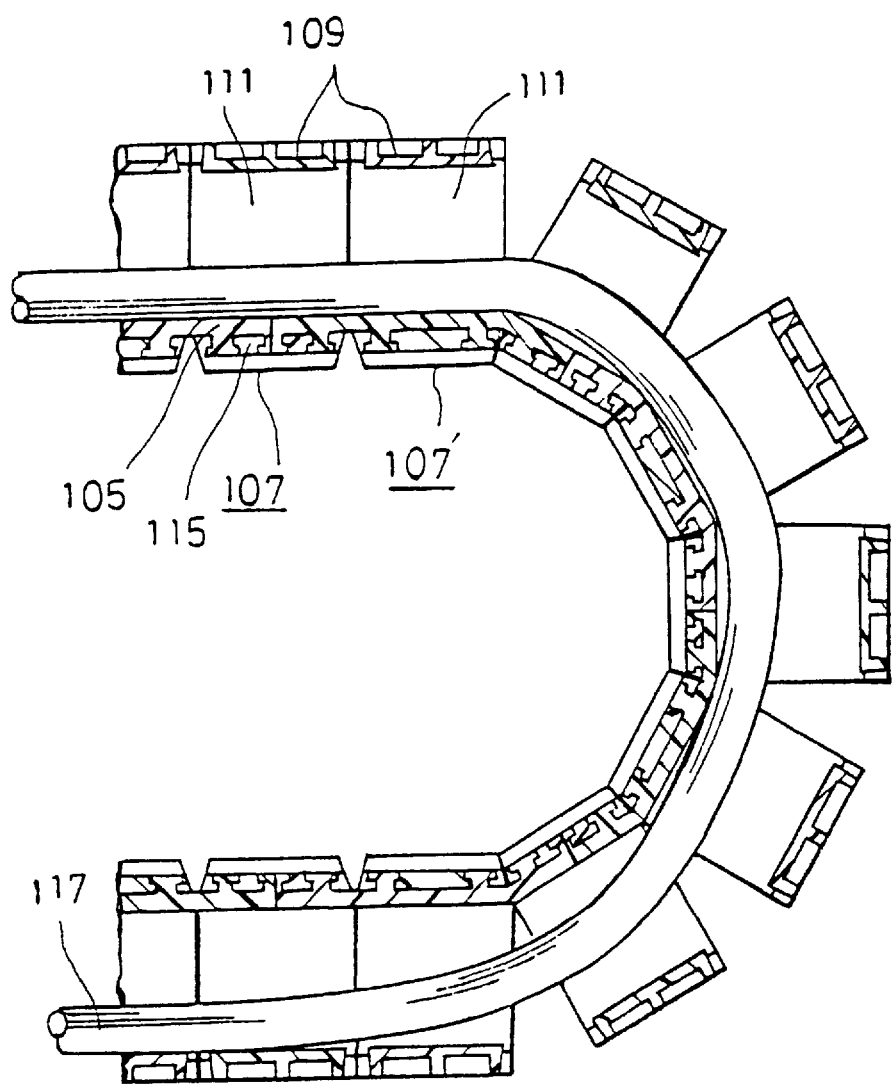
FIG. 5 is a longitudinally sectional view of a bent state of a cable chain.

Next, a usage example of the cable chain formed as described above is described below:

In FIG. 4 and FIG. 5, a cable 17/117 is gradually bent along the opening 13a of the covering member 13 at the respective chain unit members 3 and is inserted into and accommodated in the cable chain 1 (See FIG. 4). At this time, the cable is almost straightly accommodated relative to the cable chain 1. Therefore, it is possible to prevent the cable 17/117 from coming off through the respective serrated successive openings 13a.

As described above, one end of the the cable chain 1 and the accommodated cable 17/117 is attached to the fixed side and the other end thereof is attached to a movable body. As the movable body is caused to reciprocate, the cable chain 1 is able to follow the reciprocations of the movable body as shown in FIG. 5 and the cable 17/117 bent and accommodated in the respective unit members 3 due to the hinge members 5 bent by the grooves 5a is bent and is guided.

The first preferred embodiment may have the following modifications:

(1) In the above description, band-like hinge members 5 are attached to the entirety of the upper surface of a plurality of supporting plates 7 or secondarily molded thereon, thereby causing the chain unit members 3 to be linked with each other. However, hinge members may be pressure-fit between the ends of adjacent supporting plates 7 or secondarily molded, thereby causing the chain unit members to be linked with each other.

Figure 6:
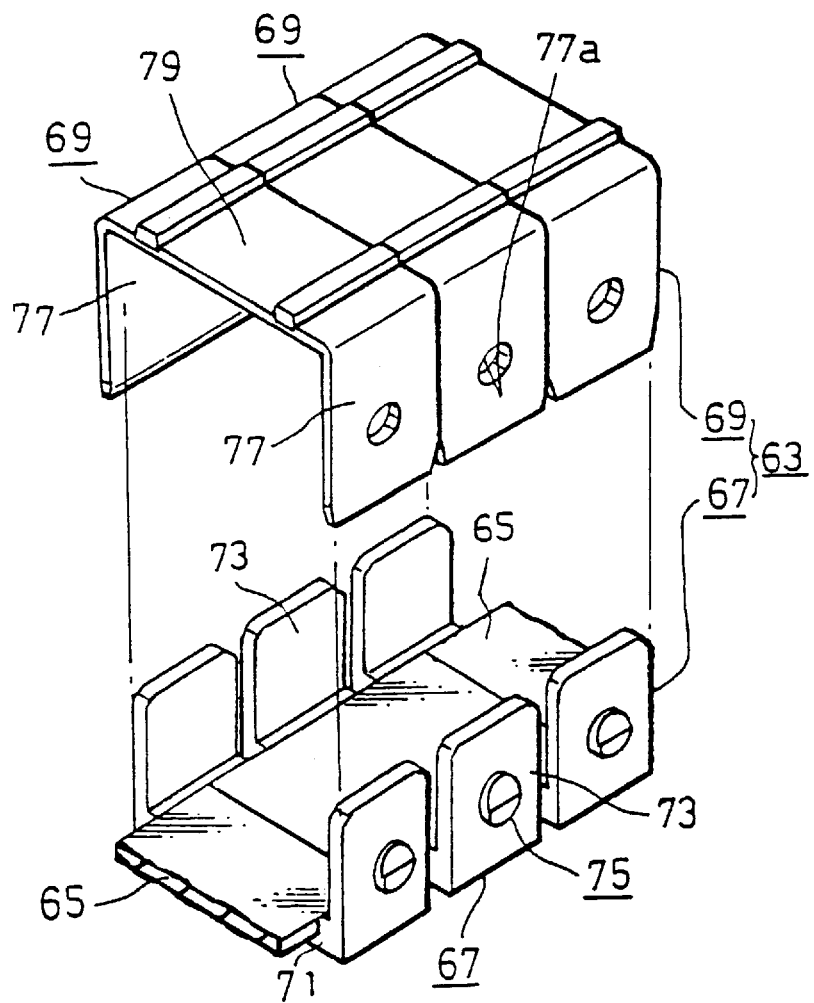
FIG. 6 is a perspective view showing a modification example of a chain unit member.
Figure 7:
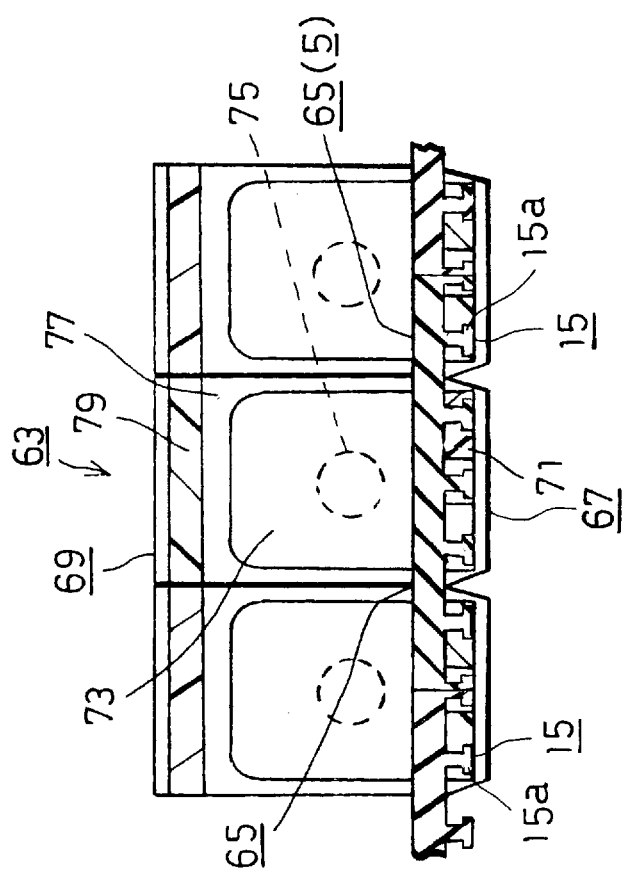
FIG. 7 is a longitudinally sectional view a chain unit member shown in FIG. 6.
Figure 8:
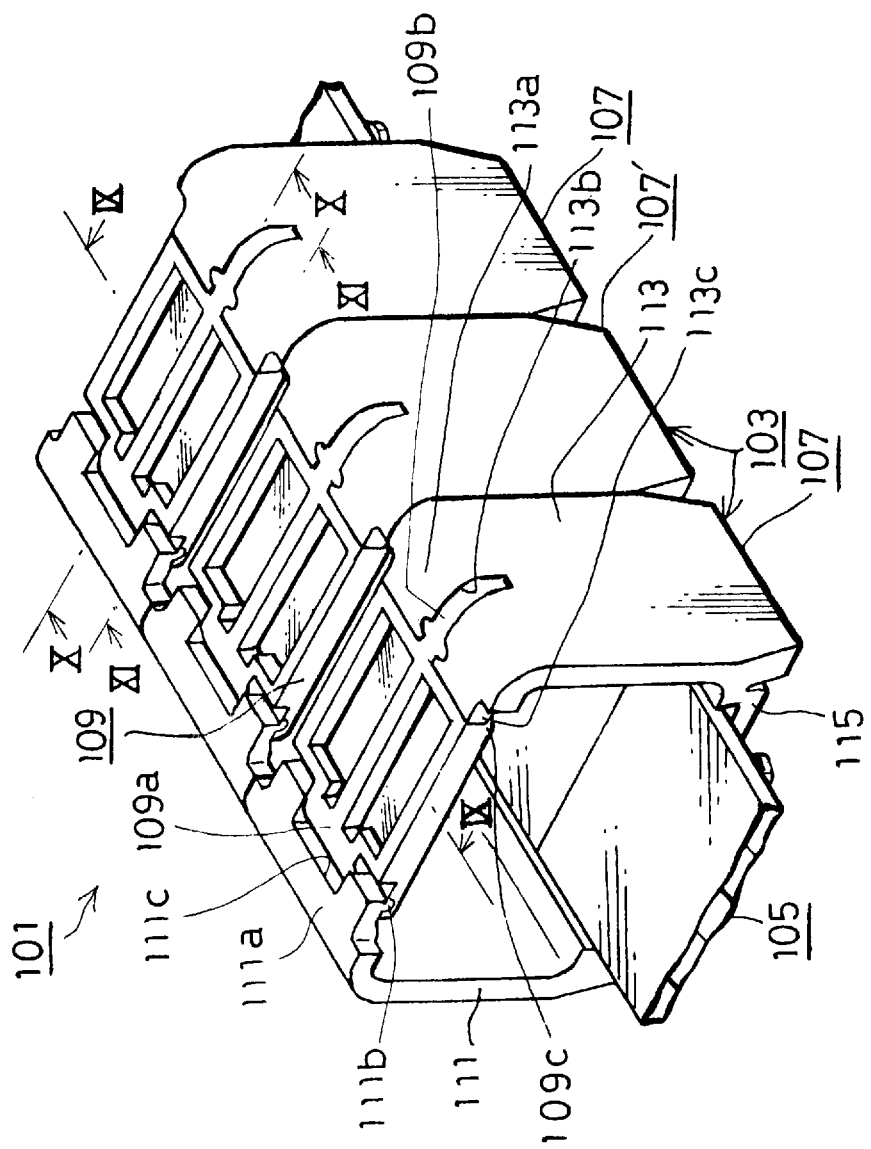
FIG. 8 is a longitudinally sectional view showing a cable chain according to a second preferred embodiment.
Figure 9:
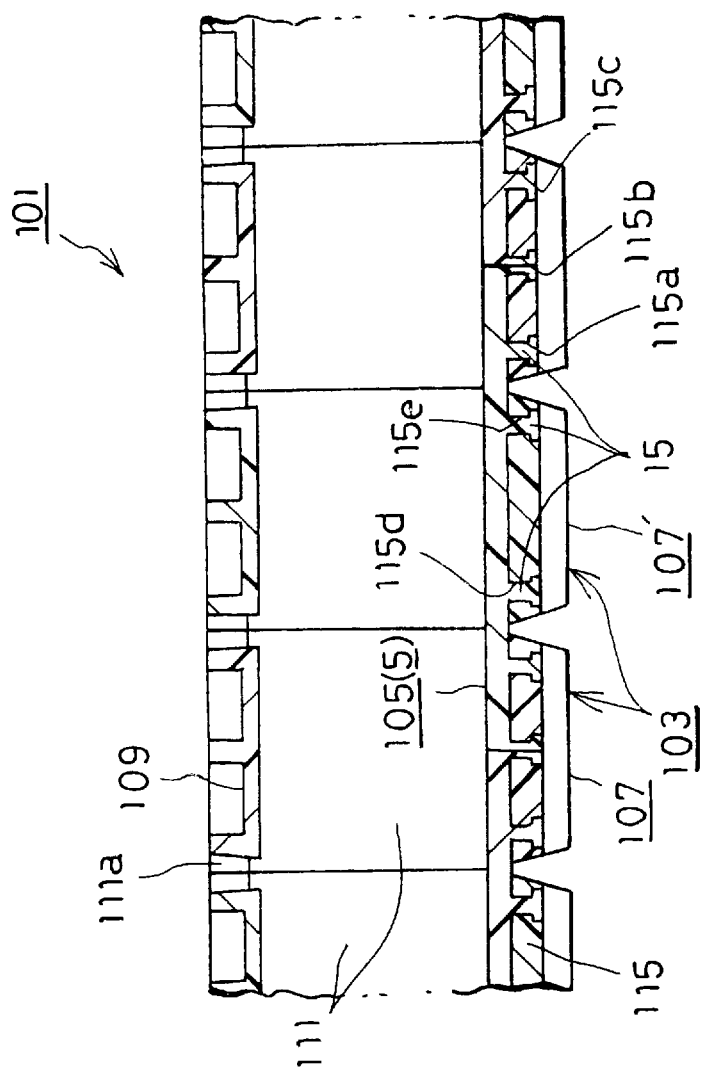
FIG. 9 is a longitudinally sectional view taken along the line IX—IX in FIG. 8.
Figure 10:
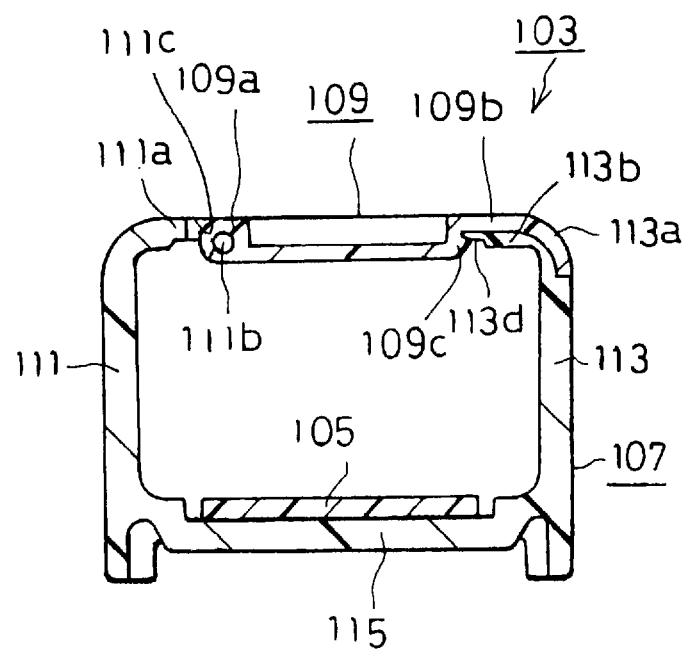
FIG. 10 is a longitudinally sectional view taken along the line X—X in FIG. 8.
Figure 11:
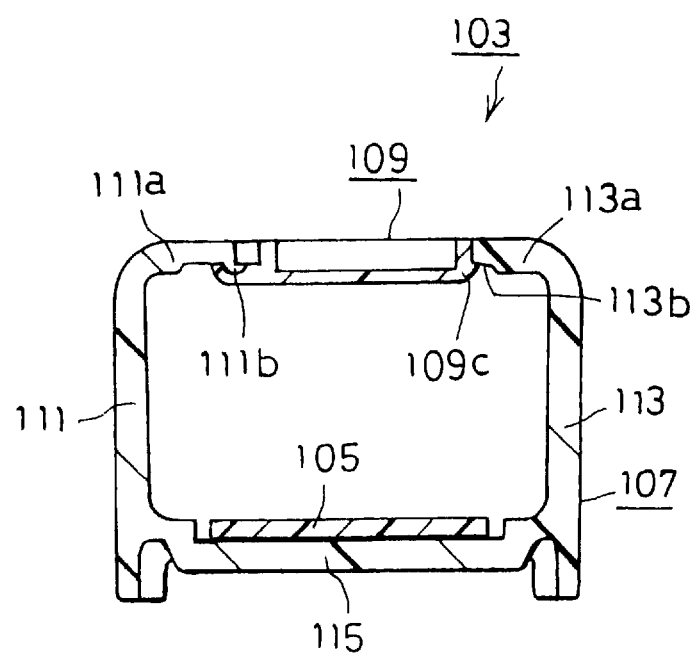
FIG. 11 is a longitudinally sectional view taken along the line XI—XI in FIG. 8.

(2) In the above description, although a covering member 13 having an opening 13a is integrally molded on the upper surface of the side wall portion 11 at each of the chain unit members 3, as shown in FIG. 6 and FIG. 7, the chain unit members 63 may be constructed by covering members 69 which cover up the base portion 67 and the upper opening of said base portion 67. and the base portions 67 may be linked with each other by hinge members 65 similar thereto. That is, the base member 67 is molded so that a pair of side plates 73 are opposite each other at both ends of the supporting plate 71, and at the same time an engaging axis 75 may be integrally formed at the side central portion of each side plate 73. The covering member 79 molds an upper surface plate 79 which links a pair of hanging-down plates 77 hanging down along the outer surface of each side plate 73 with the upper end portion of said hanging-down plate 77, and simultaneously forms an axial supporting opening 77a at the middle part of each hanging down plate 77. Still furthermore, the hinge members 65 are similar to those 5 in the above description. A detailed description thereof is omitted.

As described above, after a cable 81 is accommodated between the side plates 73 at the base portions 67 with which the respective chain unit members are mutually linked by the hinge members 65, the covering members 69 are pressure-fit while elastically deforming the hanging down plates 77 in the expanding direction from the upside of the side plates 73, and the engaging axis 79 is engaged in the axial supporting opening 77a, whereby the attaching is completed. At this time, if tapered faces are formed to be opposite each other at the end face of the engaging axis 79 and at the lower part of the hanging-down plates 77, it is possible to facilitate the pressure fitting of the covering members 69. second preferred embodiment is shown in FIGS. 8–11, wherein a cable chain 101 is constructed so that a number of chain unit members 103 are linked with each other by hinge members 105, wherein each of the chain unit members 103 is constructed so that a covering member 109 is secondarily formed at a guide member 107.

The respective guide members 107 are formed of polyamide resin (including a strengthened complex resin made of polyamide reinforced with glass fibers or carbon fibers) to have supporting plates 115, by which a pair of side plates 111, 113 retained at an appointed interval are connected to the lower parts of said side plates 111,113, and are molded to be upward channel-shaped.

Curved portions 111a,113a are bent and formed at the upper ends of the respective side plates 111, 113 so that they are caused to face each other. Each axial portion 111b is formed with a clearance 111c at the tip end of one curved portion 111a and is formed to be almost circular at the cross-section in the direction orthogonal to the connection, and the tip end portion 113a of the curved portion 111a located at both sides of said axial portions 111b is notched at the upper half part thereof and is formed to be semi-circular. A recess 113b having an appointed width is formed at the outer face of the middle portion in the connection direction at the other curved portion 113a so as to extend in the direction orthogonal to the connection, whereby the part to be engaged 113c is formed at the end portion of said recess 113b.

A plurality of through holes 115a, 115b, 115c are formed with some interval retained in the direction orthogonal to the connection at each end portion and middle portion of the supporting plate 115. Also, a plurality of through holes 115d, 115e are formed at both the ends at the supporting plate 115 of the guide member 107'(Since each member at the guide members 107' is substantially similar to those for the guide member, the same reference number is given, and the description thereof is omitted) disposed between the guide members 101 on which a plurality of through holes 115a, 115b, 115c are formed at both the ends and middle part of the supporting plate 115.

Guide members 107,107' disposed so that the space thereof is able to be communicated with each other are linked with each other by hinge member 105. Said hinge member 105 is made of elastically deformable synthetic resin such as olefin-based elastomer resin, synthetic resin having an integral hinge property such as polypyrene resin, etc., polyamide resin or bendable synthetic rubber, is located on the entire surface of the respective supporting plates 115 and is formed to have a length and a width to cover the respective covering members 107, 107'.

Furthermore, the hinge member 105 is similar to the hinge member 5 in the above first preferred embodiment. Therefore, a detailed description and modification examples are omitted herein.

A covering member 109 is secondarily molded between the curved portions 111a, 113a of the respective side plates. Said covering member 109 is formed of a synthetic resin such as polyester-based elastomer resin, etc. having a high melting point, which has a non-welding property for polyamide resin composing guide members 107. An axial supporting portion 109a which covers up the entire periphery of the central portion of the axial portion 111b and covers up the lower half peripheral part of the curved portion 111b located at both sides of the axial portion 111b is integrally formed at the end part, at the curved portion 111a side, and an engaging portion 109b fitted in a recess 113b and another engaging portion 109c engageable with the part 113c are respectively integrally formed at the side end portion at the other curved portion 113a side.

Furthermore, as regards a cable chain 101 in which guide members 107, 107' are linked with each other by a hinge member 105 which is formed like a plate in advance, a covering member 109 may be secondarily formed after preformed guide members 107, 107' are linked with each other by pre-formed hinge member 105. Also, in a case where a hinge member 105 is secondarily molded thereby causing the guide members 107, 107' to be linked with each other, a covering member 109 or hinge member 105 may be thirdly molded simultaneously with molding said hinge member 105 or after said hinge 105 or covering member 109 is secondarily molded. Still furthermore, in a case where a hinge member 105 and a covering member 109 are second-arily molded at the guide members 107,107' at the same time as described above, any polyamide based elastomer resin, polypyrene resin, or polyamide resin may be acceptable in addition to the above polyester based elastomer resin as a covering member 107 and a hinge member 105. Furthermore, in a case where a covering member 109 is molded separately from the hinge member 105 relative to the guide members 107,107', polyester resin may be also acceptable in addition to the abovementioned resin.

Each of the abovementioned resins has a high melting point characteristic. Therefore, in any case where a covering member 109 is formed of, for example, polyamide resin which is identical to that of the guide member 107,107', or where a covering member 1091 is molded by injecting polyamide resin to the cooled down and hardened guide members 107,107', both of them are able to be kept in a non-welded state.

Next, a use example of a cable chain 101 formed as above is described below.

Figure 12:
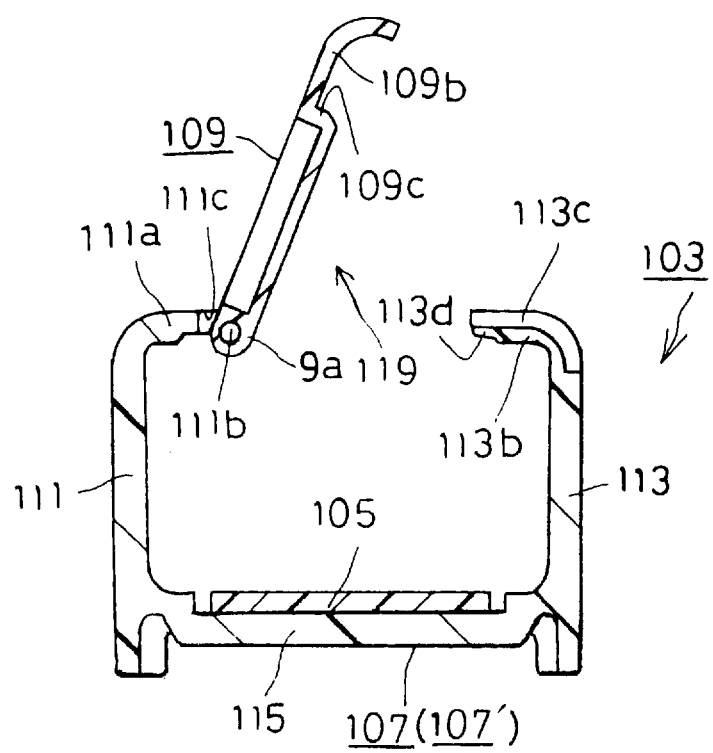
FIG. 12 is a longitudinally sectional view showing an opened state of a covering member.
Figure 13:
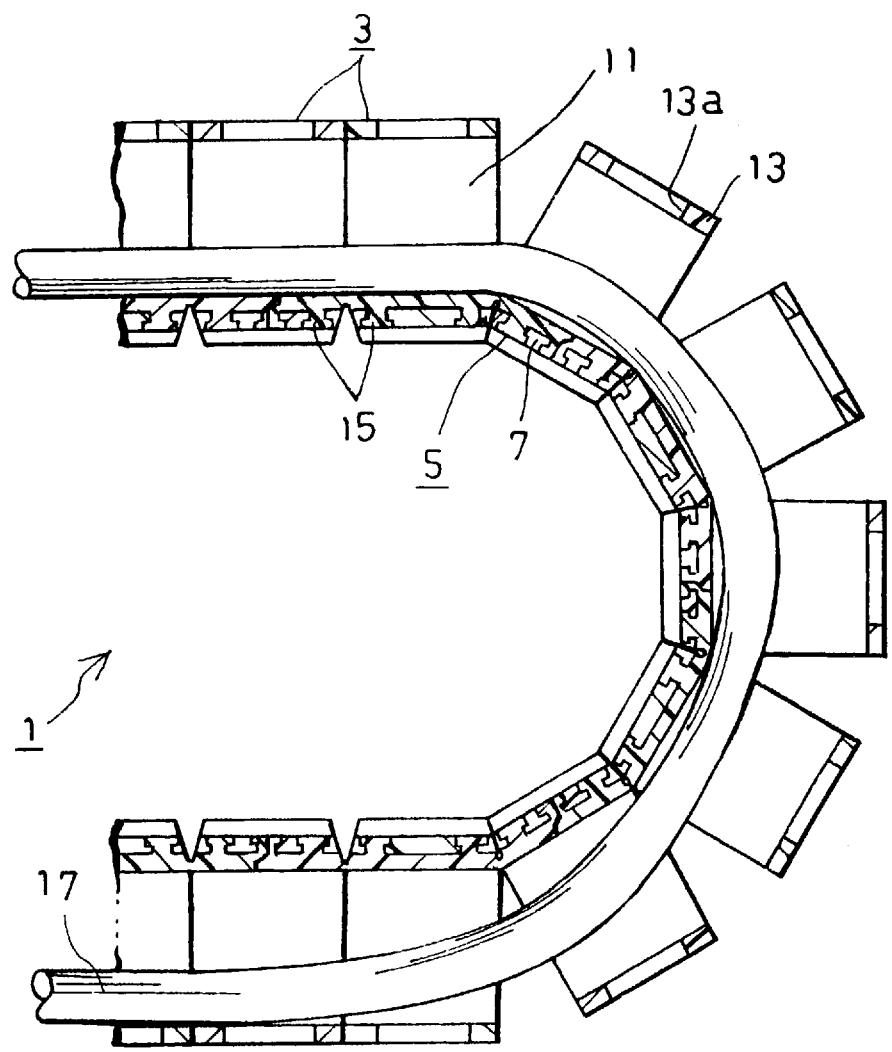
FIG. 13 is a longitudinally sectional view showing a bent state of a cable chain.

In FIG. 12 and FIG. 13, in order to accommodate a cable 117 between the side plates 111, 113 of the respective guide members 107,107' which are linked with each other, as shown in FIG. 12, a covering member 109 molded between the curved portions 111a, 113a of the side plates 111,113 is caused to rotate in the opening direction, centering around the axial portion 111b, after the engagement of the engaging portion 109c with the part 113c is cancelled by lifting the fitting portion 109b fitted in the recess 113b upward, thereby an opening 1119 to be formed between the curved portions 111a, 113a.

At this time, since said covering member 109 itself is formed in a non-welded state relative to polyamide resin of which the guide members 107,107' are formed as described above, it is possible to remove the fitting portion 109b from the recess 113b and the engaging portion 109c from the part 113c, respectively, and simultaneously it is possible to cause the axial supporting portion 109a to rotate around the axial portion 111b.

After the cable 117 is accommodated in the space between the side plates 111,113 through the opening 119 formed between the curved portions 111a, 113a of the guide members 107,107', the covering member 119 is caused to rotate in the reverse direction of the above centering around the axial portion 111b, whereby while causing the engaging portion 109c to be engaged with the part 113c, the fitting portion 109b is fitted to and inserted into the recess 113b to cause the opening between the curved portions 111a, 113a to be closed. As shown in FIG. 13, the cable chain 101 in which the cable 17 is accommodated as described above, is able to bendably guide the cable 17 in line with linear reciprocatory movements of a movable body while bending the chain unit members 103 by hinge members 105. At this time, since the axial supporting portion 109a of the covering member 109 is axially supported as described above and the engaging portion 109c is engaged with the part 113c, a closed state is able to be maintained even though a bending cable 117 is brought into contact with the inside of the covering member 109, whereby the cable 117 is able to be prevented from coming off or springing out.

Also, when the opening 119 between the curved portions 111a, 113a is opened or closed by the covering member 109 rotating around the axial portion 111b, the positional slip, in the connection direction, of the axial supporting portion 109a of the covering member 109 axially supported at the axial portion 111b is regulated by being brought into contact with the tip end of one curved portion 111a.

What is claimed is:

1. A cable chain having a number of chain unit members made of synthetic resin, each of said chain unit members comprising:

a supporting plate for connecting together a pair of side plates opposite each other at an appointed interval at ends of said supporting plate at a lower portion of the side plates;

a covering member made of synthetic resin for covering an upper opening of the respective chain unit members;

a hinge member made of synthetic resin having an integral hinge property, said hinge member being molded in advance to be a plate-like member having an engaging portion to be engaged in an attaching hole secured at the respective supporting plates of adjacent chain unit members.

2. A cable chain having a number of chain unit members made a synthetic resin, each of said chain unit members comprising:

a supporting plate for connecting together a pair of side plates opposite each other at an appointed interval at ends of said supporting plate at a lower portion of the side plates;

a covering member made of synthetic resin for covering an upper opening of the respective chain unit members;

a hinge member welded to and linked with the respective supporting plates of adjacent chain unit members by injecting a synthetic resin having an integral hinge property.

3. A cable chain as set forth in claim 2, wherein said supporting plates are made of the synthetic resin having an integral hinge property, and said hinge member is made integral with the respective supporting plates by filling openings provided therein.

4. A cable chain having a number of chain unit members made of synthetic resin, each of said chain unit members comprising:

a supporting plate for connecting together a pair of side plates opposite each other at an appointed interval at ends of said supporting plate at a lower portion of the side plates;

a covering member made of synthetic resin for covering an upper opening of the respective chain unit members, said covering member being integrally formed with an opening at a top surface thereof;

a hinge member made of synthetic resin having an integral hinge property, said hinge member being molded in advance to be a plate-like member having an engaging portion to be engaged in an attaching hole secured at the respective supporting plates of adjacent chain unit members.

5. A cable chain having a number of chain unit members made of synthetic resin, each of said chain unit members comprising:

a supporting plate for connecting together a pair of side plates opposite each other at an appointed interval at ends of said supporting plate at a lower portion of the side plates;

a covering member made of synthetic resin for covering an upper opening of the respective chain unit members, said covering member being integrally formed with an opening at a top surface thereof;

a hinge member welded to and linked with the respective supporting plates of adjacent chain unit members by injecting a synthetic resin having an integral hinge property.

6. A cable chain as set forth in claim 5, wherein said supporting plates are made of the synthetic resin having an integral hinge property, and said hinge member is made integral with the respective supporting plates by filling openings provided therein.

7. A cable chain having a number of chain unit members made of synthetic resin, each of said chain unit members comprising:

a supporting plate for connecting together a pair of side plates opposite each other at an appointed interval at ends of said supporting plate at a lower portion of the side plates;

a covering member including a hanging-down plate which hangs down along a top plate which covers an upper opening of the respective chain unit members, said covering member being made of synthetic resin and including an engaging portion for engaging at least one of said side plates;

a hinge member made of synthetic resin having an integral hinge property, said hinge member being molded in advance to be a plate-like member having an engaging portion to be engaged in an attaching hole secured at the respective supporting plates of adjacent chain unit members.

8. A cable chain having a number of chain unit members made of synthetic resin, each of said chain unit members comprising:

a supporting plate for connecting together a pair of side plates opposite each other at an appointed interval at ends of said supporting plate at a lower portion of the side plates;

a covering member including a hanging-down plate which hangs down along a top plate which covers an upper opening of the respective chain unit members, said covering member being made of synthetic resin and including an engaging portion for engaging at least one of said side plates;

a hinge member welded to and linked with the respective supporting plates of adjacent chain unit members by injecting a synthetic resin having an integral hinge property.

9. A cable chain as set forth in claim 8, wherein said supporting plates are made of the synthetic resin having an integral hinge property, and said hinge member is made integral with the respective supporting plates by filling openings provided therein.

10. A cable chain having a number of chain unit members made a synthetic resin, each of said chain unit members comprising:

a supporting plate for connecting together a pair of side plates opposite each other at an appointed interval at ends of said supporting plate at a lower portion of the side plates, a first one of said side plates including a supporting portion provided at an upper end thereof, and a second one of said side plates including an engaging portion at an upper end thereof;

a covering member made of synthetic resin having a high melting point, said covering member being molded to include a rotatable support member which is axially supported by said supporting portion of said first one of said side plates, and an engaging member for engaging said engaging portion of said second of said side plates;

a hinge member made of synthetic resin having an integral hinge property, said hinge member being molded in advance to be a plate-like member having an engaging portion to be engaged in an attaching hole secured at the respective supporting plates of adjacent chain unit members.

11. A cable chain having a number of chain unit members made of synthetic resin, each of said chain unit members comprising:

a supporting plate for connecting together a pair of side plates opposite each other at an appointed interval at ends of said supporting plate at a lower portion of the side plates, a first one of said side plates including a supporting portion provided at an upper end thereof, and a second one of said side plates including an engaging portion at an upper end thereof;

a covering member made of synthetic resin having a high melting point, said covering member being molded to include a rotatable support member which is axially supported by said supporting portion of said first one of said side plates, and an engaging member for engaging said engaging portion of said second said side plates;

a hinge member welded to and linked with the respective supporting plates of adjacent chain unit members by injecting a synthetic resin having an integral hinge property.

12. A cable chain as set forth in claim 11, wherein said supporting plates are made of the synthetic resin having an integral hinge property, and said hinge member is made integral with the respective supporting plates by filling openings provided therein.

* * * * *